United States Patent Office 2,863,876
Patented Dec. 9, 1958

2,863,876

5-ALKYL-2-(TRICHLOROMETHYL)-5-m-DIOXANE-METHANOL AND ITS CARBAMIC ACID ESTER

William A. Lott, Maplewood, and Edward J. Pribyl, Metuchen, N. J., assignors to Olin Mathieson Chemical Corporation, New York, N. Y., a corporation of Virginia No Drawing. Application October 3, 1956
Serial No. 613,616

4 Claims. (Cl. 260—340.7)

This invention relates to, and has for its object the provision of: (A) compounds of the general formula

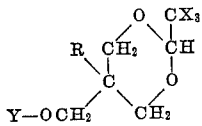

wherein X is a halogen, R is a member of the class consisting of hydrogen and lower alkyl, and Y is a member of the class consisting of hydrogen and carbamyl; and (B) methods of preparing them.

These compounds are useful and advantageous therapeutic agents, especially hypnotics. Thus, 5-methyl-2-(trichloromethyl)-5-m-dioxane methanol, a representative compound of this invention, may be administered orally (e. g. in capsule, tablet or elixir form) for preanesthetic hypnosis, and for treatment of nervous insomnia and excitement of the nervous system. Moreover, such compound possesses a higher potency and greater heat stability than hypnotics such as trichloroacetaldehyde and has the added advantage of being tasteless.

The compounds of this invention may be prepared by the method essentially comprising interacting trihydric alcohols of the general formula

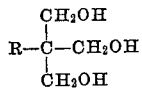

wherein R has the meaning given hereinbefore, with the hydrate of a trihaloacetaldehyde (e. g. the hydrate of trichloroacetaldehyde), in the presence of a dehydrating condensing agent (e. g. concentrated sulfuric acid), and recovering the reaction product. Examples of reactants we utilize for the purposes of this invention, include inter alia: trimethylolethane; trimethylol propane.

The following examples are illustrative of the invention:

Example 1

A mixture of 76.1 g. of chloral hydrate and 50.0 g. of trimethylolethane is stirred, cooled and treated dropwise with 60 ml. of concentrated sulfuric acid at such a rate that the temperature does not rise above 20° C. After the addition the solution is heated for two hours at 65–72° C. The reaction mixture is cooled and poured into 600 ml. of ice water. The oil which separates is extracted with 2 x 200 ml. of chloroform. The chloroform extracts are washed with 200 ml. of 5% sodium bicarbonate, 200 ml. of distilled water, dried over magnesium sulfate, filtered and distilled to remove the chloroform. The product distills at 111–116°/35 mm. and when recrystallized from 150 ml. of hexane gives 19.5 g. of a white crystalline material, M. P. about 90–92° C., 5-methyl-2-(trichloromethyl)-5-m-dioxanemethanol.

Example 2

A mixture of 67.2 g. of chloral hydrate and 50.0 g. of trimethylolpropane is stirred, cooled and treated dropwise with 54 ml. of concentrated sulfuric acid at such a rate that the temperature does not rise above 20° C. After the addition the solution is heated for two hours at 65–72° C. The mixture is cooled and poured into 600 ml. of ice-water. The oil which separates is extracted with 3 x 200 ml. of chloroform. The chloroform extracts are washed with 200 ml. of 5% sodium bicarbonate, 200 ml. of distilled water, dried over magnesium sulfate, filtered and distilled to remove the chloroform. The product, 5-ethyl-2-(trichloromethyl)-5-m-dioxanemethanol, distills at 124–125° C. at 0.15 mm. pressure and when recrystallized from 175 ml. of hexane gives 10.9 of a white crystalline material, M. P. about 103–104° C.

Example 3

A solution of 10 g. of phosgene in 180 ml. toluene is cooled to 0° C. and stirred while a solution of 24.9 g. of 5-methyl-2-(trichloromethyl)-5-m-dioxanemethanol and 19 g. of antipyrine in 50 ml. of anhydrous chloroform is added dropwise over a period of 20 minutes and allowed to stand for 16 hours at room temperature. The antipyrine hydrochloride is filtered and the filtrate distilled to remove the solvents. The residue is cooled and 150 ml. of cold 10% aqueous ammonia is added. A white solid separates from the reaction mixture. It is filtered and dried and after recrystallization from benzene there is obtained 21.0 g. of the carbamic acid ester of 5-methyl-2 - (trichloromethyl) - 5 - m - dioxanemethanol, melting at about 129–130° C.

The invention may be variously otherwise embodied within the scope of the appended claims.

We claim:

1. Compounds of the general formula

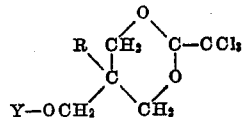

wherein R is a lower alkyl, and Y is a member of the class consisting of hydrogen and carbamyl.
2. 5-methyl-2-(trichloromethyl)-5-m-dioxanemethanol.
3. 5-ethyl-2-(trichloromethyl)-5-m-dioxanemethanol.
4. The carbamic acid ester of 5-methyl-2-(trichloromethyl)-5-m-dioxanemethanol.

References Cited in the file of this patent
UNITED STATES PATENTS 2,595,304     Schroeder _____ May 6, 1952

OTHER REFERENCES

Blicke et al.: "Journal Am. Chem. Soc," vol. 76 (1954), pages 3153–6.